United States Patent
Chayat et al.

(10) Patent No.: US 8,036,675 B2
(45) Date of Patent: Oct. 11, 2011

(54) LOAD BALANCING IN WIRELESS NETWORKS

(75) Inventors: Naftali Chayat, Kfar-Saba (IL); David Zelikovsky, Petach-Tikva (IL); Ariel Doubchak, Tel-Aviv (IL); Nadav Lavi, Rishon-LeZion (IL)

(73) Assignee: Alvarion Ltd., Tel-Aviv (IL)

( * ) Notice: Subject to any disclaimer, the term of this patent is extended or adjusted under 35 U.S.C. 154(b) by 375 days.

(21) Appl. No.: 12/414,817

(22) Filed: Mar. 31, 2009

(65) Prior Publication Data
US 2010/0248738 A1    Sep. 30, 2010

(51) Int. Cl.
*H04W 72/00*    (2009.01)
(52) U.S. Cl. ............... 455/453; 455/450; 455/422.1
(58) Field of Classification Search ............... None
See application file for complete search history.

(56) References Cited

U.S. PATENT DOCUMENTS

| | | | |
|---|---|---|---|
| 6,542,742 B2 * | 4/2003 | Schramm et al. | 455/436 |
| 6,574,474 B1 * | 6/2003 | Nielsen | 455/436 |
| 6,580,910 B1 * | 6/2003 | Mazur et al. | 455/440 |
| 6,701,150 B1 * | 3/2004 | Huang et al. | 455/439 |
| 7,808,963 B2 * | 10/2010 | Gupta et al. | 370/342 |
| 2007/0115906 A1 * | 5/2007 | Gao et al. | 370/338 |
| 2008/0085723 A1 * | 4/2008 | Tsao et al. | 455/452.2 |
| 2008/0151807 A1 * | 6/2008 | Meier et al. | 370/312 |

* cited by examiner

*Primary Examiner* — Ajit Patel (57) ABSTRACT

A load balancing system for a wireless network comprises: a base station parameter extraction unit able to extract base station availability parameters of currently available base stations; and a base station quality of service selector associated with said base station parameter extraction unit configured to determine from said parameters which of said available base stations is able to provide a currently required quality of service. The system requests resources from one such base station, thereby to ensure that mobile stations are distributed in a balanced manner between the available base stations. As well as quality of service, interference with other links may be taken into account, and uplinks and downlinks may be considered separately.

24 Claims, 7 Drawing Sheets

LOAD BALANCING IN WIRELESS NETWORKS

FIELD AND BACKGROUND OF THE INVENTION

The present invention, in some embodiments thereof, relates to load balancing and or interference minimization in wireless networks and, more particularly, but not exclusively, to such load balancing etc. in a WiMAX or like wireless cellular network, in particular including any networks using the OFDMA protocol.

WiMAX, or Worldwide Interoperability for Microwave Access, is a telecommunications technology that provides wireless data in a variety of ways, ranging from point-to-point links to full mobile cellular-type access. The name "WiMAX" was created by the WiMAX Forum, which was formed in June 2001 to promote conformity and interoperability of the standard. The forum describes WiMAX as "a standards-based technology enabling the delivery of last mile wireless broadband access as an alternative to cable and DSL".

The bandwidth and range of WiMAX make it suitable for potential applications including: connecting Wi-Fi hotspots with other parts of the Internet, providing a wireless alternative to cable and DSL for last mile broadband access, providing portable connectivity, to allow users to connect through portable devices without restriction to available hardware, providing data and telecommunications services, and providing a redundant source of Internet connectivity to protect from service loss at the main connection.

In Wi-Fi the media access controller (MAC) uses contention access—all subscriber stations that wish to pass data through a wireless access point (AP) compete for the AP's attention on a random interrupt basis. This can cause subscriber stations distant from the AP to be repeatedly interrupted by closer stations, greatly reducing their throughput. This makes services such as Voice over IP (VoIP) or IPTV, which depend on an essentially-constant Quality of Service (QoS) depending on data rate and interruptibility, difficult to maintain for more than a few simultaneous users.

In contrast, the 802.16 MAC uses a scheduling algorithm for which a mobile station needs to compete only once for initial entry into the network, hereinafter referred to as network entry or NWE. After NWE the mobile station is allocated an access slot by a base station. The time slot can enlarge and contract, but remains assigned to the subscriber or mobile station, which means that other subscribers cannot use it. In addition to being stable under overload and over-subscription (unlike 802.11), the 802.16 scheduling algorithm can also be more bandwidth efficient. The scheduling algorithm also allows the base station to control QoS parameters by balancing the time-slot assignments among the application needs of the subscriber stations.

The current IEEE-802.16e standard in fact allows the mobile station (MS) to select the most appropriate base station (BS) from those available. The standard however does not define the BS selection method that the MS is to use. The BS selection methods for network entry (NWE) and MS handover (HO) that are currently used are vendor specific.

The MS has available the following two factors:
Channel conditions
BS load

Channel condition is set according to measurements performed by the MS using known metrics such as received signal strength indication (RSSI), signal to interference noise ratio (SINR), etc. A particular feature of the known channel selection method is that it is transparent to the individual user so that two mobile stations requiring the same quality of service have the same chance of receiving attention at the same base station.

The mobile station knows the base station load because the Base Station Load is broadcast by BSs in downlink channel descriptor (DCD) messages and uplink channel descriptor (UCD) messages, messages which are sent periodically by the base station to define downlink and uplink parameters and in neighborhood advertisement (NBR-ADV) messages, messages sent periodically by the base station to define the downlink and uplink parameters of its neighbors. Parameters that may be obtained from such messages include Available downlink (DL) Radio Resources and Available uplink (UL) Radio Resources, and these parameters indicate the average percentage of unused slots in the DL and UL.

The MS can use downlink and/or uplink resource parameters or just one of them for the NWE or HO decision, but the MS currently has no means to combine the two parameters into a single decision function that considers both the downlink and uplink. Moreover, the MS is unable to introduce its QoS requirements, i.e., current connections' requirements, (which also impact the required slots) in any except the crudest way, meaning that it simply selects the BS with the most spare slots. However choosing the base station with the most available slots is not always the optimal choice, say considering interference and other issues. It is not currently possible to make a choice that optimizes for a low QoS requirement.

In addition, the MS is unable to take into consideration the interference it imposes on the network upon BS selection. Thus a MS may be more distant from a first BS than a second BS, but if the first BS has more slots then it may choose the first BS in preference to the second. However because of the increased distance it may require a stronger signal, thus interfering with numerous other MSs, in some cases unnecessarily.

Interference thus causes difficulties due to the fact that the consumption of slots (and hence the load on the BS) is defined according to the channel's conditions and modulation and coding scheme (MCS). A single MS with poor channel conditions may have an affect on the BS's load that is out of all proportion to its actual requirements. In addition, the higher the QoS requirements are, the higher the MS consumption and loading affect. Furthermore, when an MS selects a more distant BS it affects the neighboring BSs and more particularly degrades the performance of the neighboring base stations due to interference.

WO02/32156 to Nortel teaches network driven cell switching and handoff with load balancing for wireless systems. The system uses two metrics—signal strength and base station load. A function takes these two metrics as inputs and produces a factor. The higher the factor the better is the choice of base station. However, this does not take into account the mobile station's actual consumption, or effect on the actual base station load.

To conclude, currently the IEEE-802.16e standard does not standardize the base station selection method and the various vendor-specific methods in use do not include a way to combine all factors influencing the consumption of slots into a single BS selection method/decision. Rather they are transparent to the actual users so that two mobile stations requesting the same quality of service stand the same chance at the same base station. At most the base station is able to modify connections after the mobile station has connected.

SUMMARY OF THE INVENTION

The present embodiments relate to a method of combining available parameters to make a decision on base station selection, whether at the stage of new registration or at the stage of base station handover. The decision allows for the QoS required by the mobile station, or for the resources that it needs to achieve that quality of service, or for the level of interference caused to the network.

According to an aspect of some embodiments of the present invention there is provided a load balancing system for a wireless network in which wireless resources associated with base stations are made available to mobile stations, the system comprising:

a base station parameter extraction unit able to extract base station availability parameters of currently available base stations; and a base station quality of service selector associated with said base station parameter extraction unit configured to determine from said parameters which of said available base stations is able to provide a currently required quality of service, the system requesting resources from one such available and able base station, thereby to ensure that mobile stations are distributed in a balanced manner between available base stations.

In an embodiment, said base station quality of service selector is located at one member of the group comprising a mobile station, a network entity and a base station.

In an embodiment, said base station parameter extraction unit is located at one member of the group comprising a mobile station, a base station and a network entity.

An embodiment may comprise a base station interference estimator, associated with said base station parameter extraction unit, configured to estimate, from said parameters, a level of interference, with neighboring base stations and mobile stations, of a link between a given mobile station and a given base station.

An embodiment may be configured to determine which of said available and able base stations is able to provide said quality of service with minimal impact on resources, and to request resources from said minimal impact base station.

In an embodiment, said minimal impact on resources comprises one member of the group comprising the base station able to provide the quality of service for the least resources, the base station having the most resources remaining after servicing the current mobile station, and the base station having the most resources remaining after deducting residual resources and servicing the current mobile station.

In an embodiment, said base station quality of service selector is configured to extract said base station availability parameters separately for a downlink connection and an uplink connection, the system being configured to determine which of said currently available base stations is able to provide a currently available uplink quality of service and a currently available downlink quality of service and to request resources from one such available base station.

An embodiment may be configured to determine which of said available and able base stations is able to provide said uplink quality of service and said downlink quality of service with minimal impact on resources, and to request resources from said minimal impact base station.

In an embodiment, said resources are measured in terms of consumed slots.

In an embodiment, said parameters may be one or more of: downlink signal to interference noise ratio (SINR), downlink RSSI, uplink SINR, uplink RSSI, base station transmit power and NI.

In an embodiment, the uplink interference is obtained from the downlink SINR.

An embodiment may be configured to use said parameters to calculate a path loss for each of said uplink and said downlink respectively, thereby to determine the quality of service available per uplink slot and per downlink slot respectively.

An embodiment may be configured to select the base station leaving the largest number of slots remaining after providing the mobile station with the requested quality of service.

In an embodiment, said path loss calculation is weighted by a translation factor preset to optimize between interference and load.

In an embodiment, said base station quality of service selector is configured to use a target function to make said determination, said target function being one member of the group consisting of:

$$f = \max_{i \in BSs}\{(AvailableSlots_{DL,i} - load_{DL,i}^{ms}) + (AvailableSlots_{UL,i} - load_{UL,i}^{ms})\};$$

$$f = \max_{i \in BSs}\{(AvailableSlots_{DL,i} - load_{DL,i}^{ms}) + (AvailableSlots_{UL,i} - load_{UL,i}^{ms})\} \mid$$

$$(AvailableSlots_{DL,i} - load_{DL,i}^{ms}) >$$

$$TH_{DL} \text{ and } (AvailableSlots_{UL,i} - load_{UL,i}^{ms}) > TH_U$$

$$f = \min_{i \in BSs}\{load_{UL,i}^{ms}\} \mid (AvailableSlots_{DL,i} - load_{DL,i}^{ms}) >$$

$$0 \text{ and } (AvailableSlots_{UL,i} - load_{UL,i}^{ms}) > 0$$

and $$f = \max_{i \in BSs}\left\{\min\left(\frac{AvailableSlots_{DL,i} - load_{DL,i}^{ms}}{load_{DL}}, \frac{AvailableSlots_{UL,i} - load_{UL,i}^{ms}}{load_{UL}}\right)\right\}.$$

In an embodiment, said determining further comprises optimizing between available capacity at a base station and an expected channel condition of a channel opened to said base station.

According to a second aspect of the present invention there is provided a load balancing system for a wireless network in which wireless resources associated with base stations are made available to mobile stations, the system comprising:

a base station parameter extraction unit able to extract base station availability parameters of currently available base stations;

a base station interference estimator associated with said base station parameter extraction unit configured to estimate from said parameters a level of interference with neighboring base stations and mobile stations of a link between a given mobile station and a given base station; and a selector configured to select one of said currently available base stations for provision of wireless resources to said given mobile station, based on a respective estimated interference.

In an embodiment, said base station interference estimator is located at either a s mobile station, a base station or a network entity, at which the base station parameter extraction unit is also located.

According to a third aspect of the present invention there is provided a load balancing method for a wireless network in which wireless resources associated with base stations are made available to mobile stations with particular quality of service requirements, the method comprising:

extracting base station availability parameters of currently available base stations;

determining from said parameters which of said available base stations is able to provide a currently required quality of service; and requesting resources from one such available and able base station, thereby to ensure that mobile stations are distributed in a balanced manner between available base stations.

An embodiment may involve requesting said resources from the one of said available and able base stations able to provide said quality of service using a minimum of resources.

An embodiment may involve:

determining for a plurality of said currently available base stations, interference levels for links thereto; and requesting said resources from one of said available and able base stations selected to minimize said interference.

An embodiment may involve:

determining for a plurality of said currently available base stations, interference levels for links thereto; and requesting said resources from one of said available and able base stations selected for providing an optimum between using a minimum of resources and minimizing said interference.

According to a fourth aspect of the present invention there is provided a load balancing method for a wireless network in which wireless resources associated with base stations are made available to mobile stations with particular quality of service requirements, the method comprising:

extracting base station availability parameters of currently available base stations;

determining from said parameters interference levels involved with links between a given mobile station and each of said available base stations, interference being with other mobile stations and with surrounding base stations; and selecting one of said base stations for requesting of resources in such a way as to minimize said interference levels.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present embodiments relate to load balancing in wireless networks and, more particularly, but not exclusively, to such load balancing in a WiMAX network. Load balancing is provided by a multi-factor selection algorithm in which the mobile station chooses the base station most suitable for its requirements. The selection may be carried out at initial selection or at handover. Factors that may be taken into account include channel condition factors, desired quality of service (QOS), and base station load. In the known art by contrast, base station load has been used in isolation as has signal strength. Base station load is broadcast to the mobile stations as part of the WiMAX standard. The channel condition factors can be obtained or calculated as will be explained below, and the QOS required at any given time depends on the application that the mobile station is currently using.

The present embodiments provide for a way in which channel conditions may be obtained and in which the channel condition factors may be combined with QoS requirements and base station load to allow the mobile station to select a base station in a way that optimizes for these requirements.

In an embodiment the above factors are combined into a single expression for each base station that is available and the mobile station then selects the base station where the expression computes to the most suitable value.

In an embodiment the expression is an optimization expression and the base station selected is that which gives the outcome which optimizes for the factors.

An intended result is to provide load balancing between the base stations, since each mobile station makes an optimal choice between the available base stations for its required quality of service.

The present embodiments apply to multi-rate wireless networks including WiMax but not limited thereto. The embodiments are also relevant to Code Division Multiple Access (CDMA), CDMA-2000 and wideband CDMA (WCDMA) cellular radiotelephone receivers for receiving spread spectrum signals, Global System for Mobile communication (GSM) cellular radiotelephone, General Packet Radio Service (GPRS), Extended GPRS (EGPRS), third generation cellular systems (3G), 3GPP Long Term Evaluation (LTE) and the like. For simplicity, although the scope of the invention is in no way limited in this respect, embodiments of the invention described below may be related to a CDMA family of cellular radiotelephone systems that may include CDMA, WCDMA, CDMA 2000 and the like. Alternatively, embodiments of the invention may well be implemented in wireless data communication networks such as those defined by the Institute for Electrical and Electronics Engineers (IEEE).

In general the present embodiments use QoS or interference levels or an optimum therebetween to decide which BS to assign the MS. This contrasts with the current art which simply uses the remaining bandwidth at the base station and does not consider the requirements of the actual mobile station or the state of the link. The current art operates a principle of making a decision which is transparent to the individual user, but as discussed, this principle is unsatisfactory in providing effective load balancing.

In the current art, the mobile station makes the decision, and this is the method favored by the current standard. The present embodiments allow an optional alternative in which the base stations make the decision, and an option in which the network as an entity is aware of measurements and loads.

The QOS does not directly translate into a bandwidth. Rather it requires a certain bandwidth under given interference conditions. To date none of the existing art has considered QoS or interference but merely assigned on the basis of available bandwidth at the base station. The present embodiments assume that interference between users and between base stations is non-linear and thus different effects have different results. Certain users make use of or request less actual bandwidth but happen to be closer to certain other users, which means that the number of slots they would have to be provided to overcome the interference and give them the bandwidth they want would nevertheless be higher.

The prior art has generally looked at the downlink. The present embodiments may but do not necessarily include uplink requirements as well, in an optimization procedure, for example uplink RSSI.

Existing base stations are able to accept new users, refuse new users, throw off existing users, and adapt existing connections. The present embodiments enable the base station to provide a QOS as such, and thus enable the selection procedure to be relevant to the mobile station requirements as well as the base station capacity.

The present embodiments provide an algorithm, which may be centralized or distributed on the network, which redistributes subscribers over the network to provide optimal balancing of the network with respect to required load or interference.

There is provided ongoing balancing of interference and quality of service.

The embodiments further enable interference based power control, that is to say calculations of interference are made at the mobile stations and the uplink power is obtained. Using these two items of data it is possible to actively manage the uplink power from the mobile stations to overcome interference. Reference is made in this context to assignee's copending U.S. Patent Application No. 61/084,307 filed Jul. 29, 2008, the contents of which are hereby incorporated by reference.

The present embodiments further allow a particular base station to offer its services to a user. Thus different base stations could offer different qualities of service to a user, who is able to make a choice using the autonomy provided in any event by, for example WiMAX. WIMAX gives the subscriber a great deal of autonomy, so that the mobile station in any event decides which base station to connect to. The mobile station can connect to any base station of a base station list if available, or even to ignore the list, and the present embodiments allow the mobile station to take offered quality of service into account.

Two metrics, signal strength, and also base station load are retrieved by the base station. At the moment the base stations cannot know or broadcast a quality of service but the present embodiments overcome this problem and allow the translation of available slots into actual bit rate, so that the quality of service can be derived.

As mentioned, calculations are made for the downlink and uplink. It is noted that factors can give uplink information. The extracted parameters and calculations are used to select the most suitable base station. Thus different base stations may not have enough spare slots to provide the required QoS, or some may be able to provide it but at the cost of additional interference to the rest of the system. The present embodiments attempt to determine for each base station how many slots can provide the same QOS at what cost to the rest of the system.

A choice may be made of the base station that gives the best optimum between uplink and downlink slots, or the required load for the minimal number of slots, or the required load for the minimal amount of interference, or the required QoS or load per se, or the minimal interference per se.

As mentioned, the present embodiments apply generally to all wireless networks that are multi-rate, including GPRS, and CDMA. In general these networks refer to resources, whereas in WiMAX the resource is particularly referred to in terms of transmission slots. The term 'slot' as used herein may include any type of resource unit as defined and used in the WiMAX standard, and may further include a resource block or allocation resource as defined and used in LTE.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
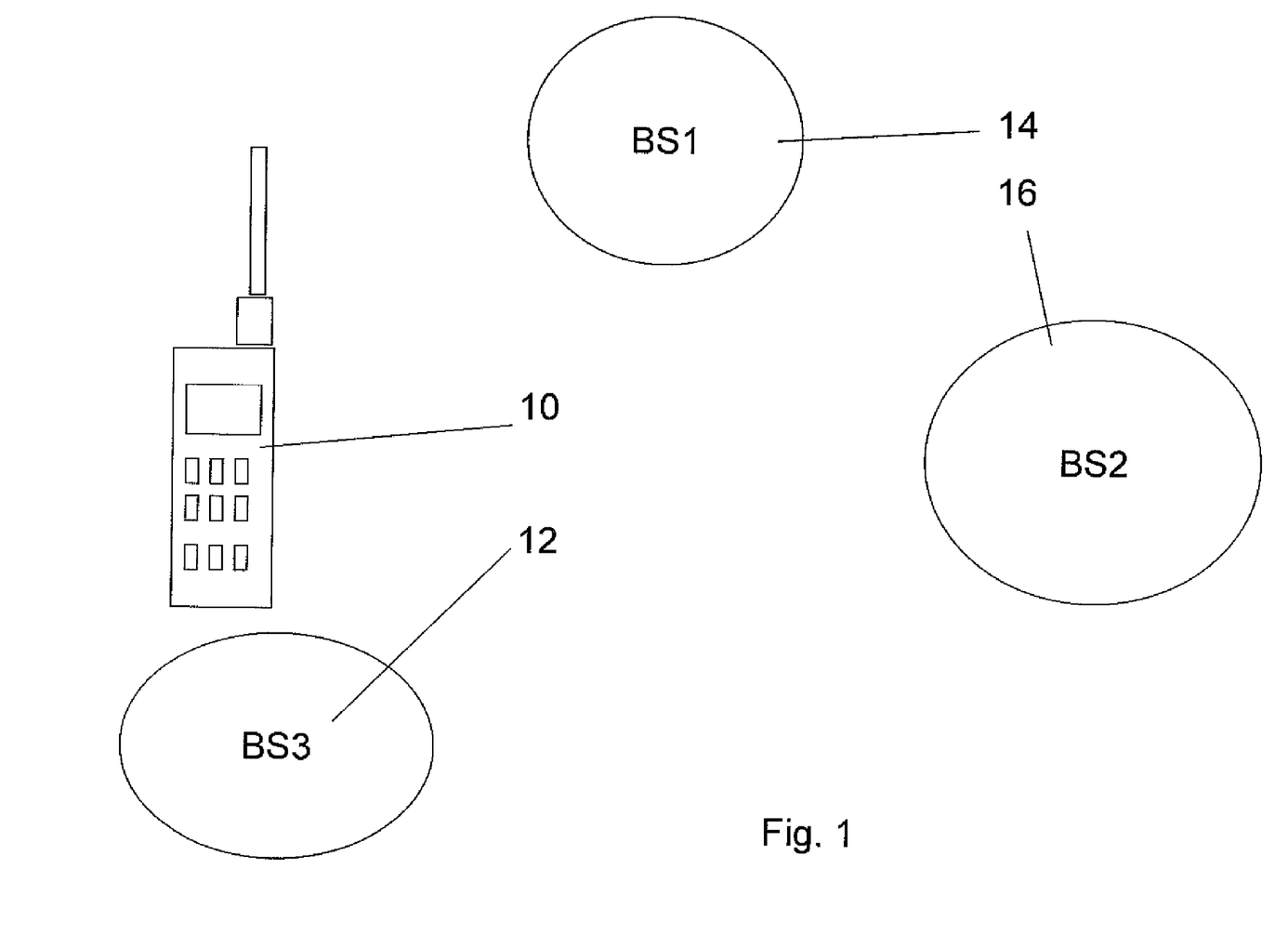
FIG. 1 is a simplified diagram showing a mobile station able to choose between requesting service from different base stations at different locations and distances.

Referring now to the drawings, FIG. 1 illustrates a mobile station 10 which is offered a choice between three available base stations 12, 14 and 16. That is to say all three base stations are visible to it. Base station 12 is the nearest and selection thereof will cause little interference with surrounding base stations. Base station 14 is further away and selection of base station 14 may cause some interference with base station 12. Base station 16 is the most distant, and selection of base station 16, even if it has the most spare slots, may be expected to cause interference to base station 14 and possibly even to base station 12. Each base station has a different number of spare slots, and the mobile station has a required quality of service.

In the prior art the mobile station 10 is able to determine which of the visible base stations has the most spare capacity and select it regardless of other considerations such as resulting interference. Alternatively the mobile station is able to find out which of the three base stations has the best channel conditions, in terms of SINR or RSSI, and select solely on that basis. However it is not able to optimize between available capacity and channel condition, nor to take into account resulting interference and neither is it able to factor in its required QoS.

Figure 2:
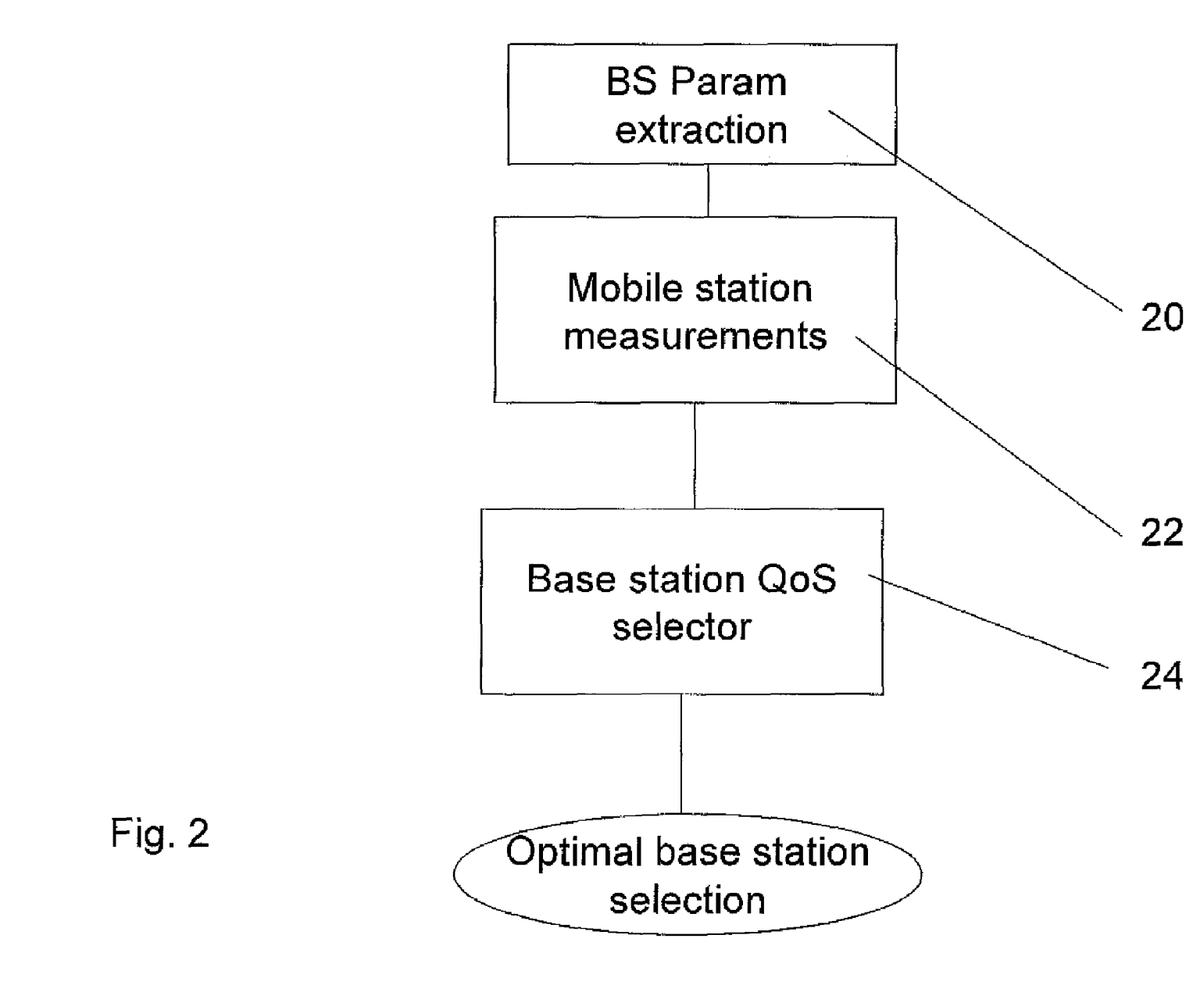
FIG. 2 is a simplified schematic diagram showing a mobile station modified according to an embodiment of the present invention to find the base station representing an optimal choice in terms of providing the desired QoS for minimal resource cost.

Reference is now made to FIG. 2, which is a simplified flow chart that shows steps of a selection procedure carried out at a mobile station modified to make an optimized selection of a base station in view of the quality of service that it requires. In an embodiment the mobile station is further able to calculate resulting interference and in a further embodiment it is able to optimize between desired quality of service, available capacity at the base station, and resulting interference, to obtain the required quality of service for minimal impact on the network resources.

A base station parameter extraction stage 20 is able to extract base station availability parameters of the currently available base stations that the mobile station can see. As per FIG. 1, mobile station 10 sees base stations 12, 14 and 16 and is able to extract parameters from each. Mobile station measurements of link quality are added 22, as will be discussed in greater detail below.

A base station quality of service selector stage 24 determines from various parameters and measurements 22, both the parameters and measurements and the determination process being discussed in greater detail below, which of the currently available base stations is able to provide a required quality of service. Thus if the mobile station currently wishes to download video at a given frame rate then it checks the parameters to see which of the mobile stations has sufficient available slots to support the frame rate. One or other of the base stations having sufficient resources is selected and the mobile station requests the resources, in the form of transmission slots, from the selected base station.

The same selection procedure is carried out for further mobile stations at first entry into the system or at handover, and the result is that mobile station load is distributed in a balanced manner between available base stations, taking into account the needs of the given mobile stations. Thus a second mobile station requiring high bandwidth would only be given to the same base station if it has sufficient available slots, or if it has the most available slots of all the base stations.

It will be appreciated that a mobile station requiring for example only to transmit a text message, may only require a single slot and no time constraint, thus a very low level of QOS. The prior art systems, which do not take into account the required resources, would treat two mobile stations, one requiring high bandwidth video and the other requiring text messaging, as equals, and thus would fail to provide efficient balancing.

As explained, the base station quality of service selection stage 24 may be carried out at a mobile station. Parameter extraction and obtaining of measurements may likewise be carried out at the mobile station. However an alternative is to provide the selection at one of the base stations. In this case the mobile stations transmit their measurements and the base stations decide how to assign the mobile stations between them. Again a variation allows for the network as a whole to be aware of measurements and loads and to decide how to carry out allocation.

In any event the mobile station takes measurements. Either the base stations or the mobile stations can determine which of the other stations are in view and available.

Figure 3:
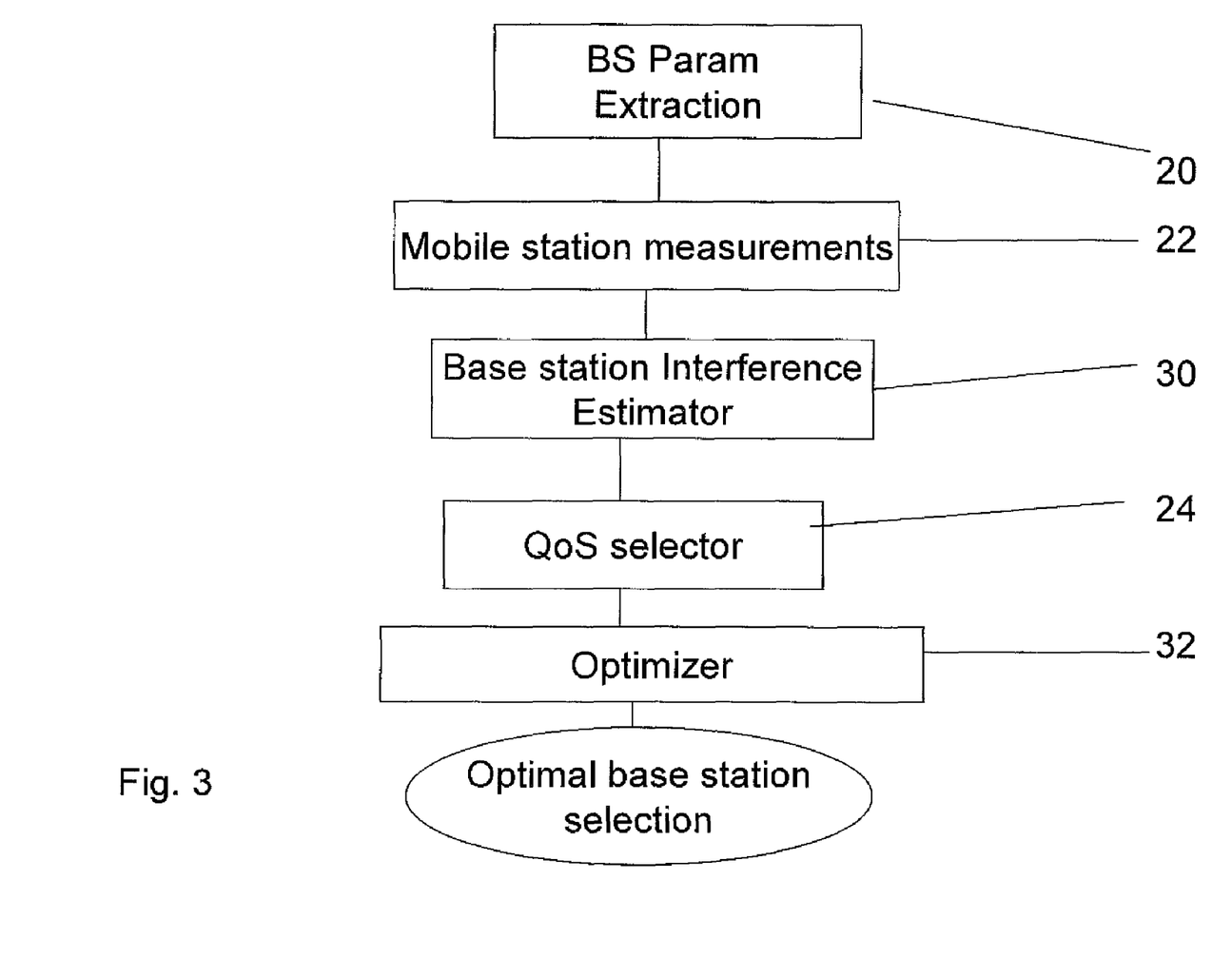
FIG. 3 is a simplified diagram of a mobile station modified according to an embodiment of the present invention to optimize between QOS and interference in selection of a base station.

Reference is now made to FIG. 3, which is a simplified diagram showing apparatus within a mobile station which has the additional capacity to estimate interference with each of the available base stations. Parts that are the same as in previous figures are given the same reference numerals and are only described to the extent necessary for an understanding of the present embodiment.

A base station interference estimator 30 uses the received and measured parameters to determine a level of interference with the neighboring base stations and mobile stations. The level of interference is calculated for each of the available base stations. The DL radio conditions may be estimated according to the DL SINR measurements. The UL interference level may be estimated from the DL SINR, the DL RSSI, and the BS transmit Power. In this connection, reference is again made to above referred corresponding U.S. Patent Application No. 61/084,307.

In one embodiment the slots can be translated into an effective bandwidth using the interference estimates combined with white noise. In addition the interference estimate is an indication of the nuisance value of the link to the rest of the system, so that it is possible to assign base stations to mobile stations taking into account the effects on the existing links.

Optimizer 32 can thus select a base station for the current mobile station by optimizing between the required quality of service and minimal interference to other units.

The optimizer 32 may operate using any one of a number of target functions, for example defining a minimal impact on resources as being the base station able to provide the service for the smallest number of slots, or may include a factor for the number of slots remaining free at the particular base station after the current allocation. Several possible target functions are given below.

According to one embodiment of the present invention, base station availability parameters and mobile station measurements may be obtained separately for a downlink connection and an uplink connection. The optimizer 32 then carries out the optimization described above for the downlinks and uplinks together to select the optimal base station on the basis of both links. Alternatively the optimizer may determine which of the downlink and uplink requires the more resources and optimize based on that link alone. As a further alternative, the optimizer may use only the downlink, or more reasonably the optimizer may use only the uplink.

Availability parameters taken into account may include downlink signal to interference noise ratio (SINR), downlink RSSI, uplink SINR, uplink RSSI, and base station transmit power.

The base station quality of service selector 24 may use the above parameters to calculate a path loss for the uplink and a path loss for the downlink. Based on the path loss the number of available slots may be translated into available bandwidth and available quality of service for the uplink and the downlink. The MS including the quality of service selector 24 is thus able to select the base station based on quality of service.

The path loss calculation may weighted by a translation factor preset to optimize between interference and load. Such a factor may be preset when setting up a given system, or adjusted by a system administrator as necessary. Thus a particular system may be set up to distribute mobile stations mainly according to required load and quality of service and another system may be set up in such a way that the main consideration is to minimize interference. A system set up to minimize interference would connect light users to any base station but heavy users only to nearby base stations. A system set up to distribute mainly according to load would simply find which of the available base stations has the capacity required.

Figure 4:
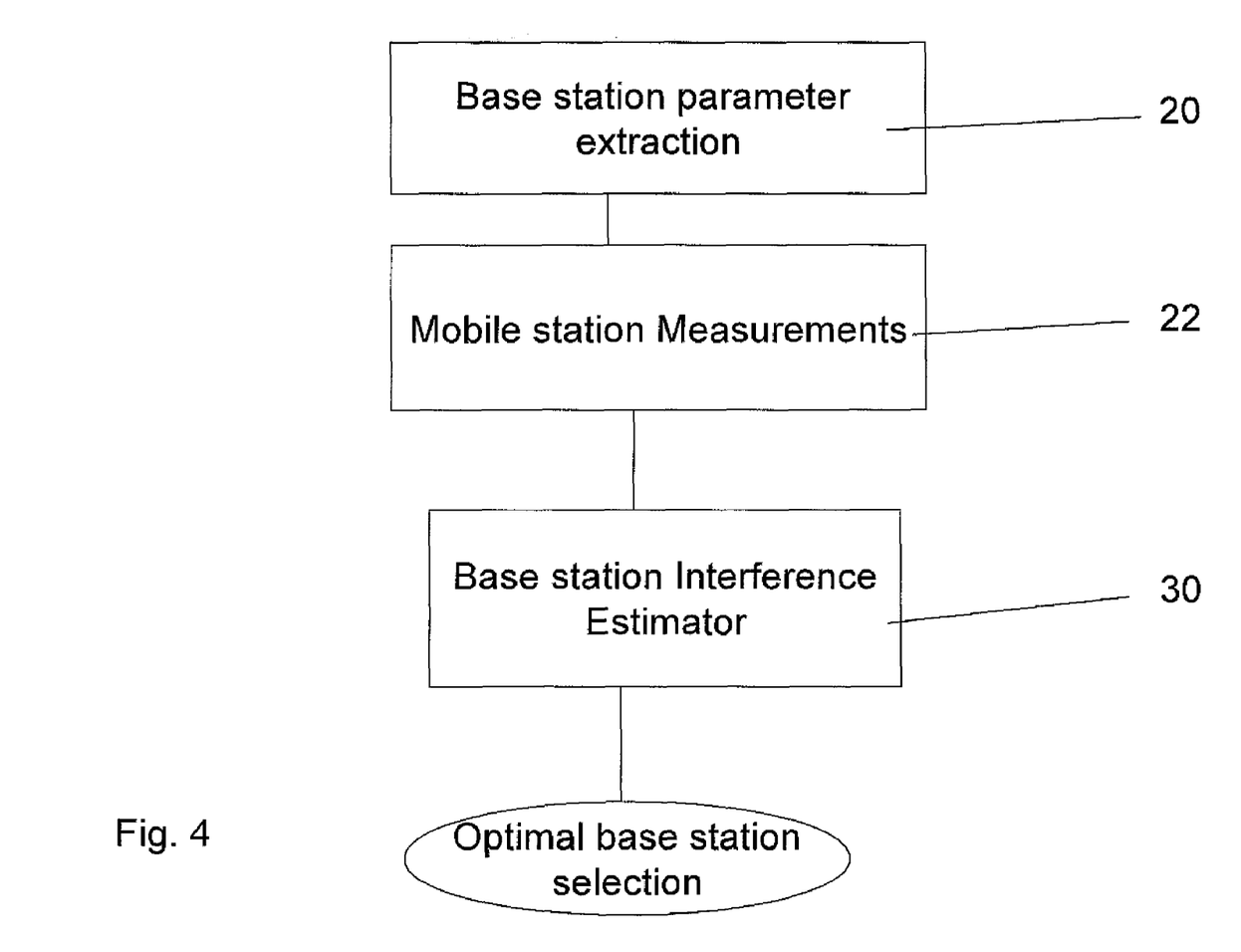
FIG. 4 is a simplified diagram illustrating a mobile station modified according to an embodiment of the present invention to select a base station based on interference estimates.

Reference is now made to FIG. 4, which is a simplified diagram illustrating a load balancing system for a wireless network in which interference alone is taken into account. In this case the base station parameters and mobile station measurements are taken as before and interference estimator 30 obtains interference measurements for links to each available base station. Then the base station selected is that for which interference is minimal. As discussed above, the interference estimator may be located at the mobile station or at the base station, or at the network entity.

The present embodiments describe a method to combine relevant factors into a single base station selection method. In an embodiment the factors are combined into an optimization technique.

The factors that are used include channel condition factors—for example modulation coding schemes (MCS), QoS requirements and base station load. In an embodiment uplink and downlink channels are both considered in the optimization process.

In an embodiment, the Channel condition factors that are used include SINR and RSSI measurements, white noise and interference (NI) and carrier power to noise ratio C/N.

QoS requirements may be assessed separately for downlink and uplink channels, and may be assessed from connection descriptors. More particularly, when a connection is created during a DSA (Dynamic Service Addition) transaction, its characteristics are defined within the DSA messages and some of these characteristics relate to QoS, for example latency and minimum and maximum rates. These characteristics are separately provided for uplink and downlink directions as many uses do not require the same QoS in both directions.

A further parameter is base station (BS) load—As mentioned in the background, the base stations make available to the mobile stations parameters regarding slot availability on the uplink and downlink connections.

Figure 5:
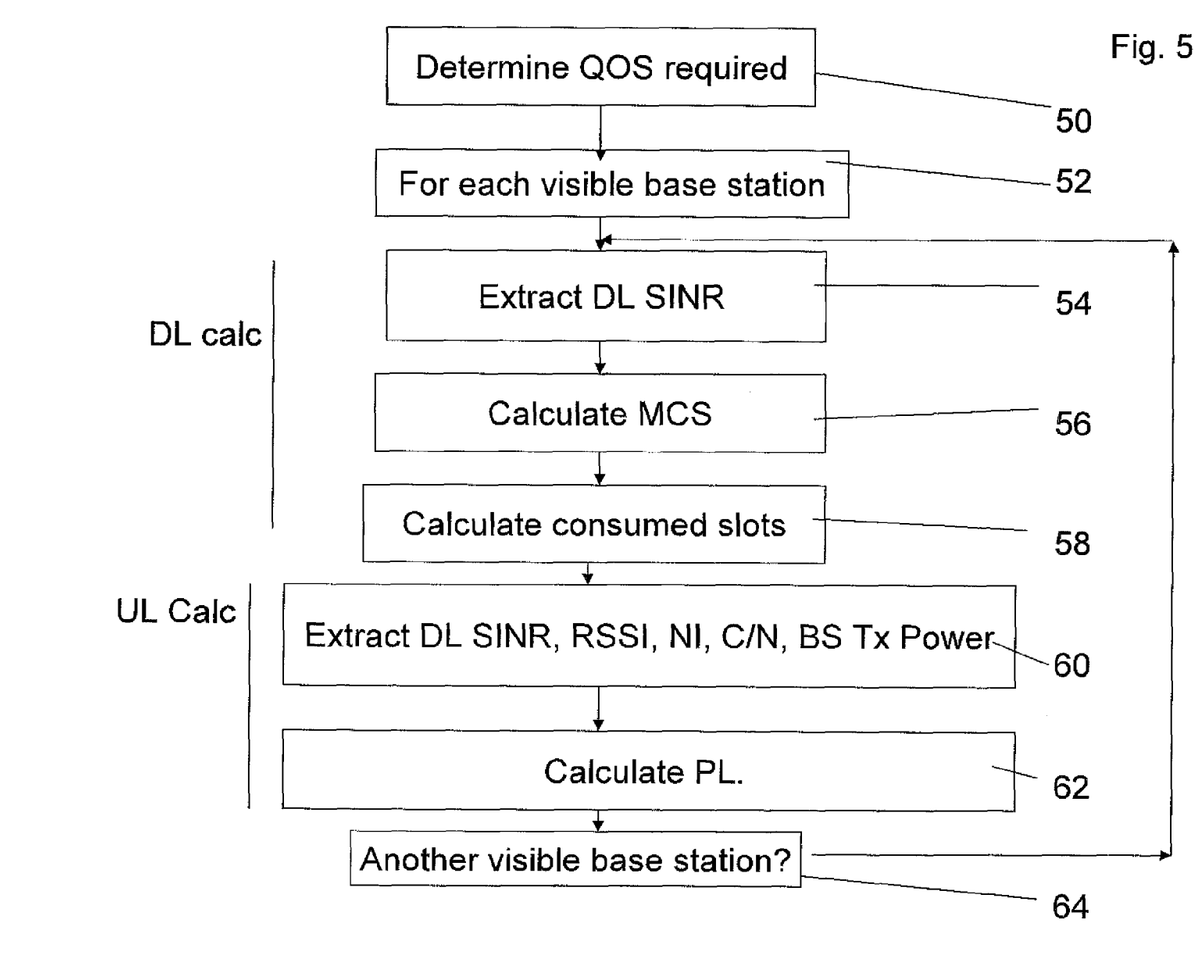
FIG. 5 is a simplified flow chart illustrating a procedure for calculating uplink and downlink parameters per base station for use in base station selection according to embodiments of the present invention.

Reference is now made to FIG. 5, which is a flow chart showing the first part of the procedure for selecting the optimal base station. FIG. 5 shows downlink and uplink calculations made for each individual visible base station.

The procedure determines the QOS required 50 and then for each visible base station 52 performs downlink (DL) calculations boxes 54-58:
 a. Extract DL SINR measurements
 b. Obtain the channel conditions (MCS). They may be available either:
   i. according to a predefined lookup table (SINR→MCS), or
   ii. according to a broadcast lookup table (per BS)
 c. Calculate the consumed slots
   i. According to QoS requirements and MCS $$LoadDL = \frac{\sum_{i \in C} rate_i}{MCS \times 48}$$

where the summation is over C, which is the set of DL connections the MS has, and $rate_i$ is the required rate from the QoS parameters delivered in the DSA transactions.

In other words the rate of each channel is summed. The summed rate is then divided by the channel quality and a factor to give a number of spare slots. The factor 48 represents the number of sub-carriers per slot. Individual measurements may be averaged or used in an additional prediction method which takes into account the measurement history. Traffic rate can also be based on online measurements or averaging.

Figure 6:
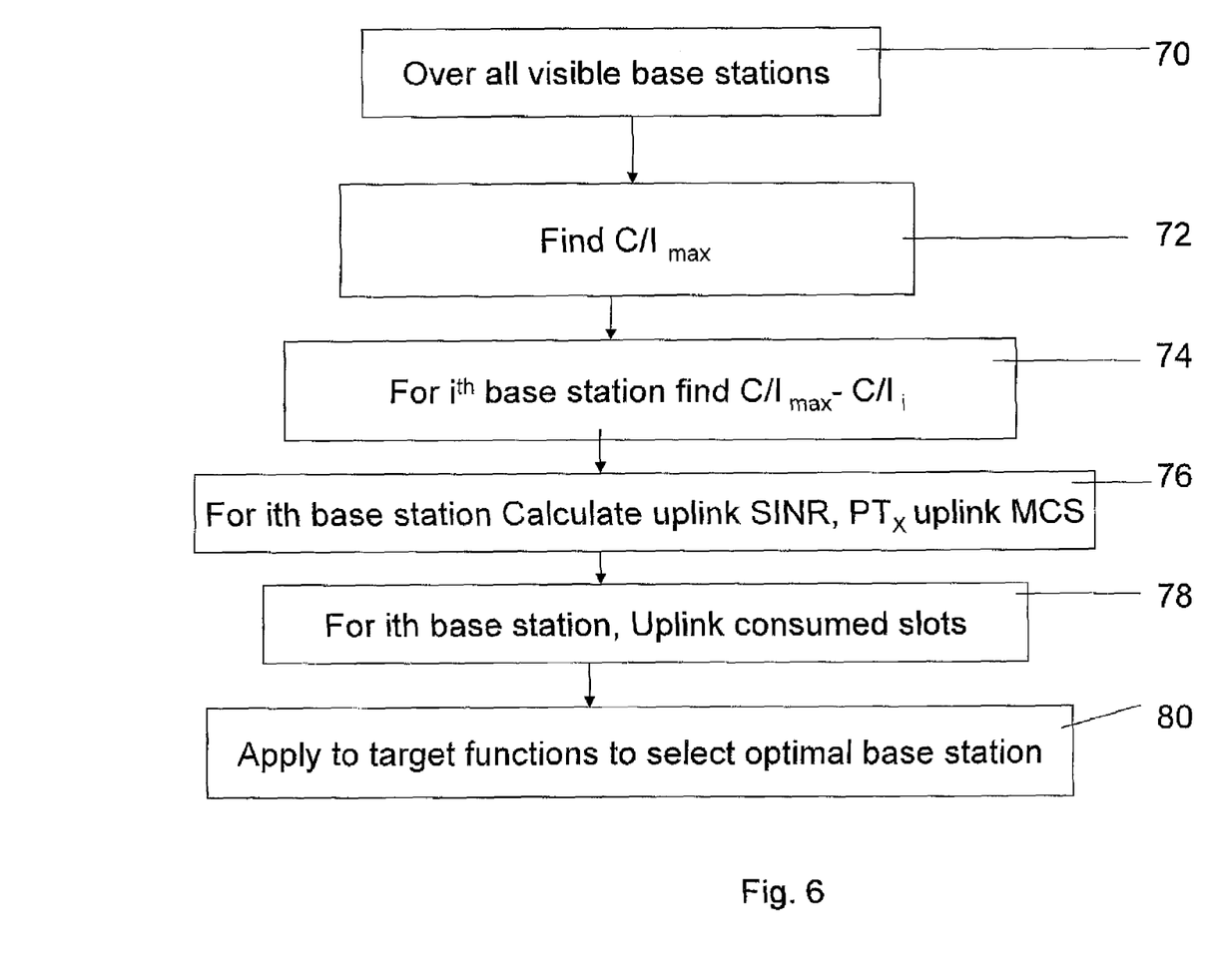
FIG. 6 is a simplified flow chart illustrating a procedure for using the parameters obtained in FIG. 6 for optimal selection of a base station according to embodiments of the present invention.

The mobile station then performs uplink (UL) calculations, boxes 60-62:
 d. Extract DL SINR and RSSI measurements—It is noted that the downlink SINR is an indicator for uplink interference since the interference experienced by the MS in the DL is proportional to the interference created by the MS in the UL to the entire network.
 e. Extract white noise and interference NI from MAP. It is noted that MAP is one of the first base station transmissions within a given frame. Within the map the base station provides directions or information regarding the downlink transmissions in the current frame and uplink allocations in the following frame. The MS can extract the NI (noise) from the MAP.
 f. Extract C/N table from the uplink channel descriptor (UCD) message.
 g. Extract base station transmit (BS Tx) power
 h. Calculate path loss (PL) from RSSI and BS Tx power Reference is now made to FIG. 6 which shows the continuation of the procedure of FIG. 5. After the aforementioned calculations the MS performs the following steps over all the visible base stations—stage 70:

Notice, unless stated otherwise, the values defined are in dB.
 1. Find the BS with the maximum downlink C/I, define $C/I_{max}$ as the maximal downlink C/I over all BSs, where C/I is the carrier to interference ratio. This ratio is similar to SNR but only considers the interference and ignores white noise—stage 72.
 2. For every $BS_i$ calculate: $X_i = C/I_{max} - C/I_i$—box 74. In order to keep the same interference to the network the MS should reduce his transmitting power by $X_i$.
 3. The estimated power density of the MS to the BS with the maximum SINR should be estimated ($P_{ref}$). One way to estimate it is using the formula $$P_{ref,Linear} = \frac{C/I_{max,Linear}}{PL_{Linear}} (NI_{Linear} - N_{0,Linear})$$

where the values in the formula are in linear units ($P_{ref,Linear}$, $NI_{Linear}$ and $N_{0,Linear}$ are in units of mW/Hz for example) where $N_{0,Linear}$ is the thermal noise floor density.
 4. Calculate UL SINR using PL, NI, and PTx=max{$P_{ref}$}–$X_i \times \alpha$ (where $\alpha$ is a translation factor from interference to load. PT is transmission power.) as follows: UL SINR=PL+PTx−NI as per box 76.

More particularly, $\alpha$ is a free parameter that is set, typically by the system administrator or programmer. When $\alpha=1$ then maximum weight is given to interference, when $\alpha=0$ then maximum weight is given to load. $\alpha$ allows the system setup to provide for a tradeoff between the desired load as the main allocation factor and the amount of interference expected being the main factor. A value of $\alpha$ close to 1 allows the system to punish a mobile station that wants large amounts of resources merely in order to overcome large amounts of interference, whereas a value close to 0 merely finds the base station best able to provide the required load. FIG. 2 is an example of the extreme case of α=1, and FIG. 4 is an example of the case of α=0.

Returning to FIG. 6, and the procedure continues as follows:

5. Calculate uplink MCS from (3) and C/N table
6. Calculate the consumed slots, as per box 78.
   a. According to QoS requirements and MCS $$load_{UL} = \frac{\sum_{i \in C} rate_i}{MCS \times 48},$$

where C is the set of UL connections the MS has.

Then MS selects the preferred BS as per box 80 according to a target function thus: $f(AvailableSlots_{DL,i}, load_{DL,i}^{ms}, AvailableSlots_{UL,i}, load_{UL,i}^{ms})$ where $AvailableSlots_{DL,i}$ and $AvailableSlots_{UL,i}$ are available slots in DL and UL respectively for BS i, and load is the number of slots required by ms on BS i.

For example, $$f = \max_{i \in BSs} \{(AvailableSlots_{DL,i} - load_{DL,i}^{ms}) + (AvailableSlots_{UL,i} - load_{UL,i}^{ms})\}.$$

Possible Target Functions

Figure 7:
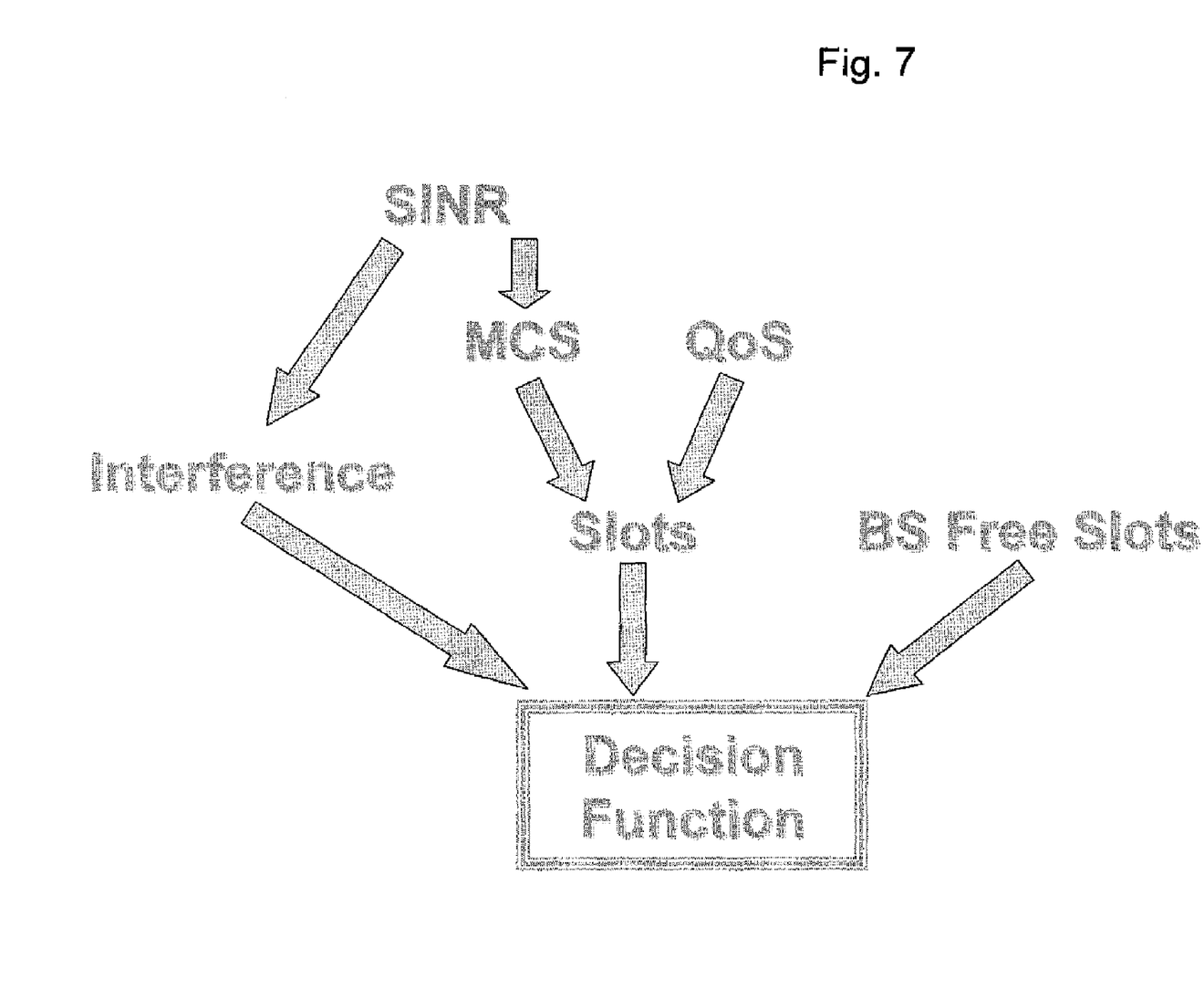
FIG. 7 is a simplified chart showing various factors which the present embodiments are able to take into account in selecting a base station.

Reference is now made to FIG. 7 which illustrates a range of factors that are taken into account in making the final decision. A range of actual target functions for use in the base station selection the final stage of FIG. 6, includes the following four functions, which either directly or indirectly via the above calculations, make use of these factors:

$$f = \max_{i \in BSs} \{(AvailableSlots_{DL,i} - load_{DL,i}^{ms}) + (AvailableSlots_{UL,i} - load_{UL,i}^{ms})\}$$

This function finds the base station that leaves the highest number of available slots after subtracting the required load. The available slots are calculated separately for uplink and downlink to give a total of remaining slots.

$$f = \max_{i \in BSs} \{(AvailableSlots_{DL,i} - load_{DL,i}^{ms}) + (AvailableSlots_{UL,i} - load_{UL,i}^{ms})\} \mid$$
$$(AvailableSlots_{DL,i} - load_{DL,i}^{ms}) > TH_{DL}$$
$$\text{and } (AvailableSlots_{UL,i} - load_{UL,i}^{ms}) > TH_{UL}$$

where $TH_{UL}$ and $TH_{DL}$ are thresholds that can be set to define required residual resources, that is to say a number of slots that the system always wants to maintain free for system uses.

This second function takes the remaining slots in the uplink and the downlink and divides them by the remaining slots in the downlink to produce a ratio which is then tested against the downlink threshold. The uplink remaining slots (without being made into a ratio) are tested against the uplink threshold.

$$f = \min_{i \in BSs} \{load_{UL,i}^{ms}\} \mid (AvailableSlots_{DL,i} - load_{DL,i}^{ms}) > 0$$
$$\text{and } (AvailableSlots_{UL,i} - load_{UL,i}^{ms}) > 0$$

This function finds the base station which has the smallest non-zero ratio of uplink load (required slots) to downlink remaining slots, and separately the smallest possible positive difference between the uplink available slots and load.

$$f = \max_{i \in BSs} \left\{ \min\left( \frac{AvailableSlots_{DL,i} - load_{DL,i}^{ms}}{\overline{load_{DL}}}, \frac{AvailableSlots_{UL,i} - load_{UL,i}^{ms}}{\overline{load_{UL}}} \right) \right\},$$

where $\overline{load_{DL}}$ and $\overline{load_{UL}}$ are the typical DL and UL load of a subscriber in the system respectively. This target function compares remaining slots against typical required load in the system, so that users with lower than typical load requirements are favored. Minimizising associates the user with the base station that can accommodate him with the fewest remaining slots.

It is noted that although FIGS. 5 and 6 refer to the information from the base stations being gathered at the mobile stations, and the calculations being carried out at the mobile stations, it is equally possible for the base stations or network entities to gather information from the mobile stations and for the network to make calculations based on the mobile stations visible to each base station.

It is noted that in a case where calculations are made at the mobile station, it could be that a given MS could deliberately ignore interference as a factor, and simply try to obtain its QoS regardless of the effects on the rest of the system. The base stations may thus look for MSs causing excessive interference in this way and control them, say by reducing power to reduce the interference. In order to do this the base station simply needs to make its own calculation of interference on the given link and can decide to restrict power based thereon. In practice the MS calculation becomes such as to predict what QOS the base station is prepared to give him given the current circumstances.

A base station may deliberately favor certain subscribers, say its gold users, who it may wish to reward with a better quality of service when resources are lacking.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A load balancing system for a wireless network in which wireless resources associated with base stations are made available to mobile stations, the system comprising:
a base station parameter extraction unit able to extract base station availability parameters of currently available base stations; and
a base station quality of service selector associated with said base station parameter extraction unit configured to determine from said parameters which of said available base stations is able to provide a currently required quality of service, the system requesting resources from one such available and able base station, thereby to ensure that mobile stations are distributed in a balanced manner between available base stations.

2. The load balancing system of claim 1, wherein said base station quality of service selector is located at one member of the group comprising a mobile station, a network entity and a base station.

3. The load balancing system of claim 1, wherein said base station parameter extraction unit is located at one member of the group comprising a mobile station, a base station and a network entity.

4. The load balancing system of claim 1, further comprising a base station interference estimator, associated with said base station parameter extraction unit, configured to estimate, from said parameters, a level of interference, with neighboring base stations and mobile stations, of a link between a given mobile station and a given base station.

5. The load balancing system of claim 1, further configured to determine which of said available and able base stations is able to provide said quality of service with minimal impact on resources, and to request resources from said minimal impact base station.

6. The load balancing system of claim 5, wherein said minimal impact on resources comprises one member of the group comprising the base station able to provide the quality of service for the least resources, the base station having the most resources remaining after servicing the current mobile station, and the base station having the most resources remaining after deducting residual resources and servicing the current mobile station.

7. The load balancing system of claim 1, wherein said base station quality of service selector is configured to extract said base station availability parameters separately for a downlink connection and an uplink connection, the system being configured to determine which of said currently available base stations is able to provide a currently available uplink quality of service and a currently available downlink quality of service and to request resources from one such available base station.

8. The load balancing system of claim 7, further configured to determine which of said available and able base stations is able to provide said uplink quality of service and said downlink quality of service with minimal impact on resources, and to request resources from said minimal impact base station.

9. The load balancing system of claim 1, wherein said resources are measured in terms of consumed slots.

10. The load balancing system of claim 1, wherein said parameters comprise at least one member of the group consisting of: downlink signal to interference noise ratio (SINR), downlink RSSI, uplink SINR, uplink RSSI, base station transmit power and NI.

11. The load balancing system of claim 10, wherein the uplink interference is obtained from the downlink SINR.

12. The load balancing system of claim 8, configured to use said parameters to calculate a path loss for each of said uplink and said downlink respectively, thereby to determine the quality of service available per uplink slot and per downlink slot respectively.

13. The load balancing system of claim 12, configured to select the base station leaving the largest number of slots remaining after providing the mobile station with the requested quality of service.

14. The load balancing system of claim 12, wherein said path loss calculation is weighted by a translation factor preset to optimize between interference and load.

15. The load balancing system of claim 1, wherein said base station quality of service selector is configured to use a target function to make said determination, said target function being one member of the group consisting of:

$$f = \max_{i \in BSs} \{(AvailableSlots_{DL,i} - load_{DL,i}^{ms}) + (AvailableSlots_{UL,i} - load_{UL,i}^{ms})\};$$

$$f = \max_{i \in BSs} \left\{ (AvailableSlots_{DL,i} - load_{DL,i}^{ms}) + (AvailableSlots_{UL,i} - load_{UL,i}^{ms}) \right\} \Big|$$

$$(AvailableSlots_{DL,i} - load_{DL,i}^{ms}) >$$

$$TH_{DL} \text{ and } (AvailableSlots_{UL,i} - load_{UL,i}^{ms}) > TH_U$$

$$f = \min_{i \in BSs} \{load_{UL,i}^{ms}\} \Big| (AvailableSlots_{DL,i} - load_{DL,i}^{ms}) > 0$$

$$\text{and } (AvailableSlots_{UL,i} - load_{UL,i}^{ms}) > 0$$

and $$f = \max_{i \in BSs} \left\{ \min\left( \frac{AvailableSlots_{DL,i} - load_{DL,i}^{ms}}{load_{DL}}, \frac{AvailableSlots_{UL,i} - load_{UL,i}^{ms}}{load_{UL}} \right) \right\}.$$

16. The load balancing system of claim 1, wherein said determining further comprises optimizing between available capacity at a base station and an expected channel condition of a channel opened to said base station.

17. A load balancing system for a wireless network in which wireless resources associated with base stations are made available to mobile stations, the system comprising:
a base station parameter extraction unit able to extract base station availability parameters of currently available base stations;
a base station interference estimator associated with said base station parameter extraction unit configured to estimate from said parameters a level of interference with neighboring base stations and mobile stations of a link between a given mobile station and a given base station; and
a selector configured to select one of said currently available base stations for provision of wireless resources to said given mobile station, based on a respective estimated interference.

18. The load balancing system of claim 17, wherein said base station interference estimator is located at one member of the group comprising a mobile station, a base station and a network entity.

19. The load balancing system of claim 18, wherein said base station parameter extraction unit is located at said member.

20. A load balancing method for a wireless network in which wireless resources associated with base stations are made available to mobile stations with particular quality of service requirements, the method comprising:
   extracting base station availability parameters of currently available base stations;
   determining from said parameters which of said available base stations is able to provide a currently required quality of service; and
   requesting resources from one such available and able base station, thereby to ensure that mobile stations are distributed in a balanced manner between available base stations.

21. The method of claim 20, further comprising requesting said resources from the one of said available and able base stations able to provide said quality of service using a minimum of resources.

22. The method of claim 20, further comprising:
   determining for a plurality of said currently available base stations, interference levels for links thereto; and
   requesting said resources from one of said available and able base stations selected to minimize said interference.

23. The method of claim 20, further comprising:
   determining for a plurality of said currently available base stations, interference levels for links thereto; and
   requesting said resources from one of said available and able base stations selected for providing an optimum between using a minimum of resources and minimizing said interference.

24. A load balancing method for a wireless network in which wireless resources associated with base stations are made available to mobile stations with particular quality of service requirements, the method comprising:
   extracting base station availability parameters of currently available base stations;
   determining from said parameters interference levels involved with links between a given mobile station and each of said available base stations, interference being with other mobile stations and with surrounding base stations; and
   selecting one of said base stations for requesting of resources in such a way as to minimize said interference levels.

* * * * *